United States Patent [19]

Brackett

[11] Patent Number: 4,779,472

[45] Date of Patent: Oct. 25, 1988

[54] MOTION CONVERTER

[76] Inventor: Douglas C. Brackett, 196 Pine St., Portland, Me. 04102

[21] Appl. No.: 925,757

[22] Filed: Oct. 30, 1986

[51] Int. Cl.⁴ .............................................. F16H 21/18
[52] U.S. Cl. ........................................... 74/50; 74/49; 74/25
[58] Field of Search ................... 74/49, 50, 23, 89, 75, 74/44, 45, 25; 384/310, 312

[56] References Cited

U.S. PATENT DOCUMENTS

| Re. 25,028 | 8/1961 | Thompson | 384/312 |
|---|---|---|---|
| 399,593 | 3/1889 | Worth et al. | 74/50 |
| 543,768 | 7/1895 | Haag | 74/50 |
| 947,233 | 1/1910 | Hammond | 74/49 |
| 2,775,128 | 12/1956 | Young | 74/49 |
| 3,451,276 | 6/1969 | Wadlow et al. | 74/50 |
| 3,941,003 | 3/1976 | Garrison et al. | 74/44 |
| 4,078,439 | 3/1978 | Iturriaga-Notario | 74/53 |
| 4,339,960 | 7/1982 | Senft | 74/50 |
| 4,590,812 | 5/1986 | Brackett | 74/55 |

FOREIGN PATENT DOCUMENTS

| 203395 | 12/1986 | European Pat. Off. | 74/49 |
|---|---|---|---|
| 336037 | 6/1920 | Fed. Rep. of Germany | . |
| 584082 | 9/1933 | Fed. Rep. of Germany | 74/50 |
| 487469 | 4/1918 | France | 74/50 |
| 68 | of 1904 | United Kingdom | 74/50 |
| 363855 | 12/1931 | United Kingdom | 74/50 |
| 533047 | 2/1941 | United Kingdom | 74/50 |

OTHER PUBLICATIONS

Rappaport, "5 Linkages for Straight-Line Motion", Mechanisms, Linkages, and Mechanical Controls, McGraw-Hill Book Co., © 1965, pp. 72-73.

Primary Examiner—Leslie A. Braun
Assistant Examiner—Scott Anchell
Attorney, Agent, or Firm—Ralph W. Selitto, Jr.

[57] ABSTRACT

A device for interconverting rectilinear and rotary motion is designed so as to reduce side thrust exerted on a frame by a slide as the slide reciprocates linearly relative to the frame and such rectilinear motion is converted into the rotary motion of a crank or vice versa. More particularly, an elongated opening, which receives a crankpin of the crank such that the crankpin moves back and forth along the elongated opening, is provided in a swing mounted for oscillatory movement relative to the slide. At least one arm is pivotally attached to the frame and to the swing so as to effect the oscillatory motion of the swing relative to the slide as the slide reciprocates relative to the frame. As the slide reciprocates relative to the frame, the orientation of the elongated opening relative to the slide is constantly varied.

92 Claims, 7 Drawing Sheets

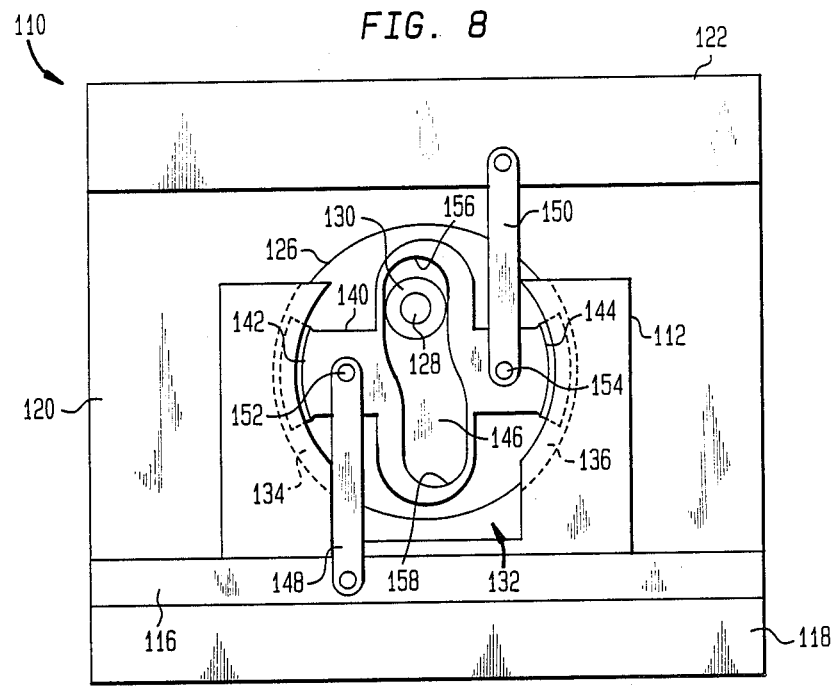
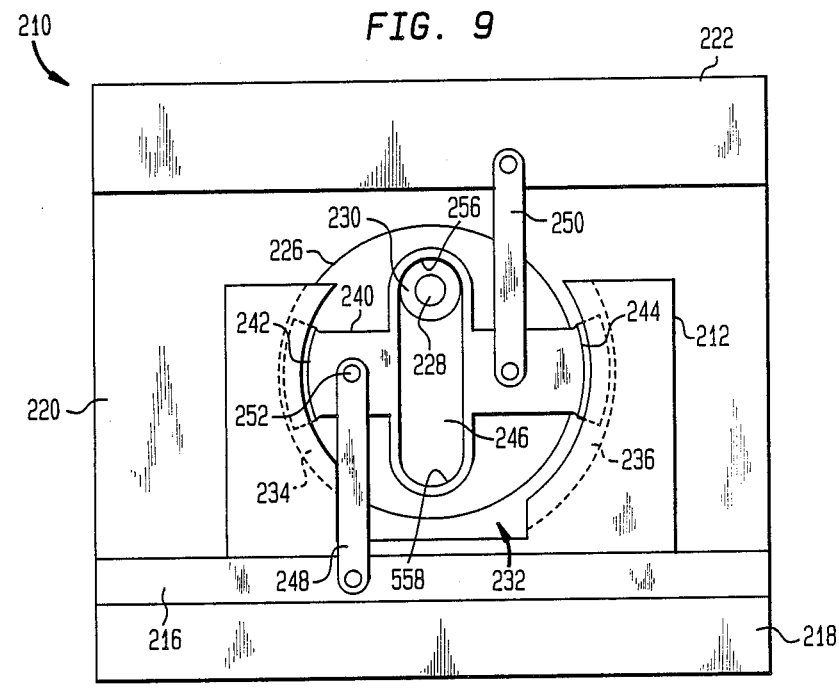

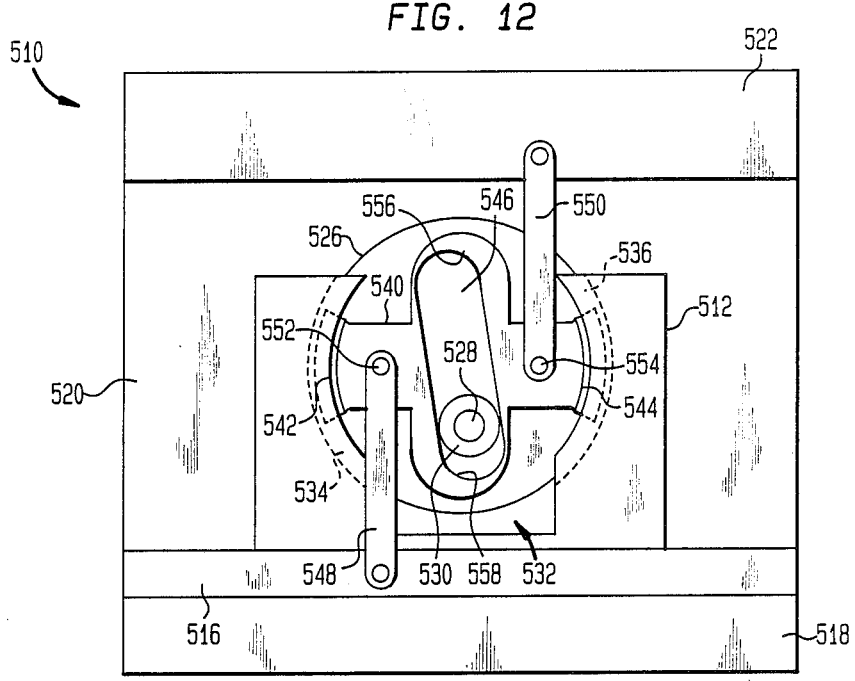

4,779,472

MOTION CONVERTER

FIELD OF THE INVENTION

The present invention relates to devices for interconverting rectilinear and rotary motion or, in other words, devices for converting rectilinear motion to rotary motion or vice versa.

BACKGROUND OF THE INVENTION

In the past, almost all devices for converting rotary motion to rectilinear motion have been plagued by side thrust (i.e., forces acting at right angles to the direction of linear movement). Side thrust is disadvantageous because it can cause considerable wear in the reciprocating parts of such devices.

U.S. Pat. Nos. 947,233; 2,775,128 and 4,078,439 relate to devices which attempt to overcome side thrust by employing a slide connected to a crank or eccentric through a rotary bearing mounted in a relatively large revolving disc. Because the revolving discs have to be mounted in bearing races, these prior devices would be expensive and limited to circular configurations with diameters less than the width of the slide. Moreover, it has been found that the large bearing surfaces provided by the rotating discs of such devices offer no real advantage since the stress on the bearing is always acting essentially at a point, and, therefore, the bearing does not distribute such stress to any substantial degree.

SUMMARY OF THE PRESENT INVENTION

The present invention relates to a new and improved device for interconverting rectilinear and rotary motion. More particularly, the device includes a frame, a slide mounted for reciprocating linear movement relative to the frame, and a rotatable crank. The crank includes a crankshaft and a crankarm, as well as a crankpin which is received in an elongated opening of the slide such that the crankpin moves back and forth along the opening as the crank rotates, whereby the rotary motion of the crank is converted into the rectilinear motion of the slide or vice versa. In accordance with one aspect of the improvement, reducing means is connected between the frame and the slide for reducing side thrust exerted on the frame by the slide as the slide reciprocates relative to the frame.

In one embodiment, the opening of the slide is provided in a swing mounted for oscillatory movement relative to the slide. At least one arm is pivotally attached to the frame and the swing so as to effect the oscillatory movement of the swing relative to the slide as the slide reciprocates relative to the frame. The arm or arms can also reduce side thrust by distributing forces into the frame, the crankshaft thereby receiving more useable force from the crankarm due to the redistribution of the side thrust friction normally experienced in a trackway or other means used to guide the slide during its reciprocating movement.

In accordance with another aspect of the improvement, the orientation of the opening relative to the slide is constantly varied as the slide reciprocates relative to the frame. By varying the orientation of the opening, there is a mechanical advantage realized by the device. The variation in the orientation of the opening is achieved by the oscillatory movement of the swing relative to the slide as the slide reciprocates relative to the frame.

BRIEF DESCRIPTION OF THE DRAWINGS

For a better understanding of the present invention, reference is made to the following detailed description of various exemplary embodiments considered in conjunction with the accompanying drawings, in which:

FIG. 8 is an elevational view of the motion converter illustrated in FIG. 7;

FIG. 9 is an elevational view of a third exemplary embodiment of a motion converter constructed in accordance with the present invention, the motion converter being shown at a 270° crank angle;

FIG. 12 is an elevational view of a sixth exemplary embodiment of a motion converter constructed in accordance with the present invention, the motion converter being shown at about an 80° crank angle; and FIG. 13 is an elevational view of a seventh exemplary embodiment of a motion converter constructed in accordance with the present invention, the motion converter being shown at about an 80° crank angle.

DETAILED DESCRIPTION OF THE EXEMPLARY EMBODIMENTS

Figure 1:
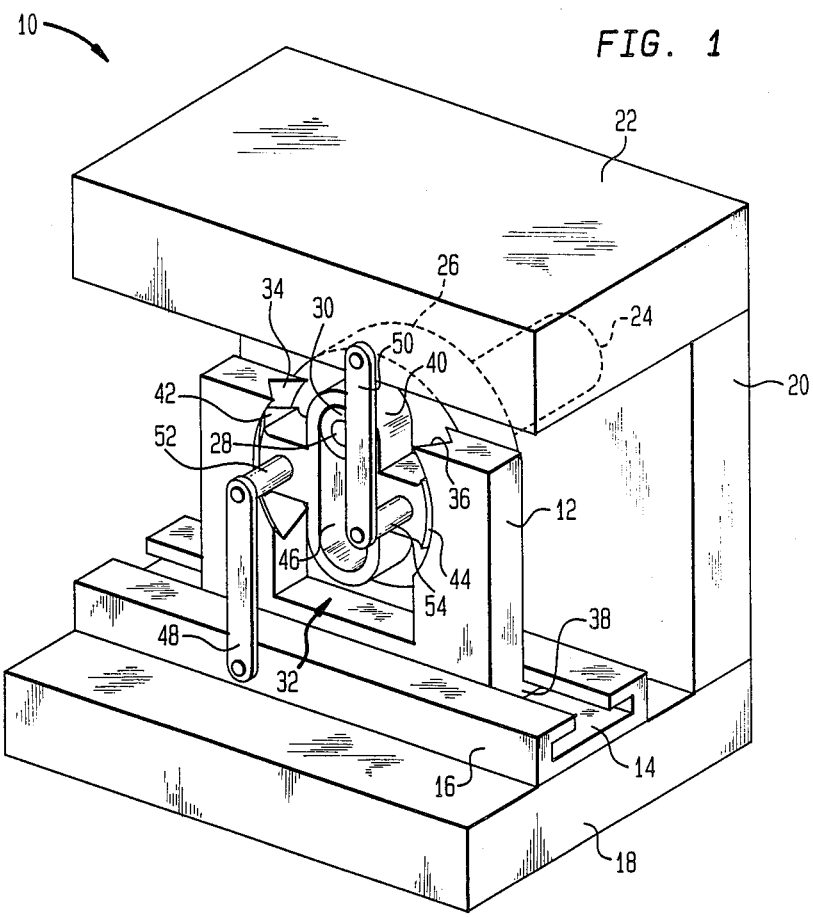
FIG. 1 is a perspective view of a first exemplary embodiment of a motion converter constructed in accordance with the present invention, the motion converter being shown at a 270° crank angle.
Figure 6:
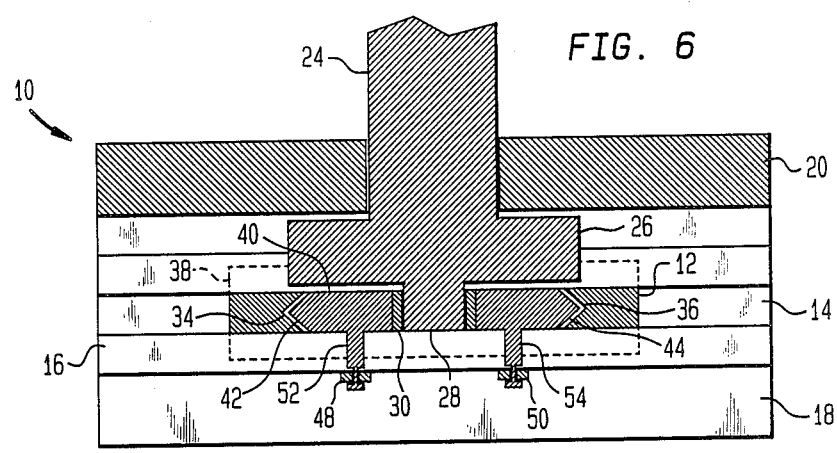
FIG. 6 is a cross-sectional view, taken along line VI—VI of FIG. 5 and looking in the direction of the arrows, of the motion converter illustrated in FIG. 5.

Referring primarily to FIGS. 1 and 6, there is shown a motion converter 10 which includes a slide 12 mounted for back and forth linear (i.e., rectilinear) movement along a groove 14 in a trackway 16. The trackway 16 is formed integrally with a lower frame member 18. A bearing plate 20 is mounted between the lower frame member 18 and an upper frame member 22.

A crankshaft 24 is rotatably mounted in the bearing plate 20. A crankarm 26, in the form of a disc which lies in a plane arranged normal to the crankshaft 24, is attached to the crankshaft 24 for conjoint rotation therewith. A crankpin 28, which carries a rotatable bearing member 30, is attached to the crankarm 26 such that the crankpin 28 is parallel to but offset from the crankshaft 24. Thus, as the crankshaft 24 rotates, the crankpin 28 and hence the bearing member 30 travel in a circular (i.e., orbital) path.

The slide 12 includes an open area 32 which is flanked by arcuate grooves 34, 36. The slide 12 also includes a rail 38 which is slidably received in the groove 14 of the trackway 16. A swing 40 is positioned for oscillatory movement in the open area 32. The swing 40 includes arcuate bearing shoes 42, 44 which are slidably received in the grooves 34, 36, respectively. Alternatively, either the grooves 34, 36 or the bearing shoes 42, 44 can be provided with rollers or any other suitable type of bearing element so as to provide rolling, rather than sliding, contact between the grooves 34, 36 and the bearing shoes 42, 44, respectively. The swing 40 also includes an elongated opening 46 which receives the crankpin 28 such that the bearing member 30 can roll along the opening 46 in a manner to be described hereinafter.

Arms 48, 50 are pivotally attached to pins 52, 54, respectively, which extend from the swing 40 on opposite sides of the opening 46. The arm 48 is also pivotally attached to the trackway 16 and hence to the lower frame member 18, while the arm 50 is also pivotally attached to the upper frame member 22 for a purpose to be described hereinafter.

With reference to FIGS. 2–5, one operating cycle of the motion converter 10 will now be described. At the 0° crank angle position depicted in FIG. 2, the crankpin 28 and the bearing member 30 are positioned intermediate an upper end 56 and a lower end 58 of the opening 46. In this position, the slide 12 is at one end of its stroke, the opening 46 and the arms 48, 50 being skewed relative to each other. The angle of the opening 46 is selected so as not to unduly restrict the movement of the crankpin 28 from the 0° crank angle position to the 90° crank angle position.

Figure 3:
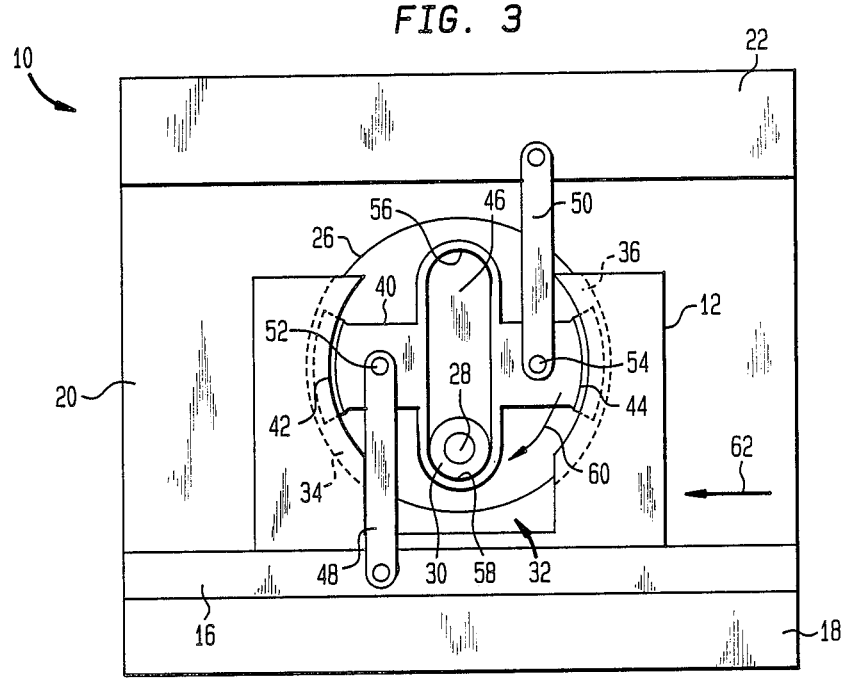
FIG. 3 is an elevational view of the motion converter illustrated in FIG. 1, the motion converter being shown at a 90° crank angle.

In the 90° crank angle position depicted in FIG. 3, the crankpin 28 has rotated in a direction indicated by arrow 60 and the bearing member 30 has moved to the lower end 58 of the opening 46. In this position, the slide 12 has moved in a direction indicated by arrow 62 to its mid-stroke position. Such movement of the slide 12 causes the arms 48, 50 to change the angular position of the swing 40, thereby pivoting the swing 40 in a clockwise direction to the position illustrated in FIG. 3.

Figure 4:
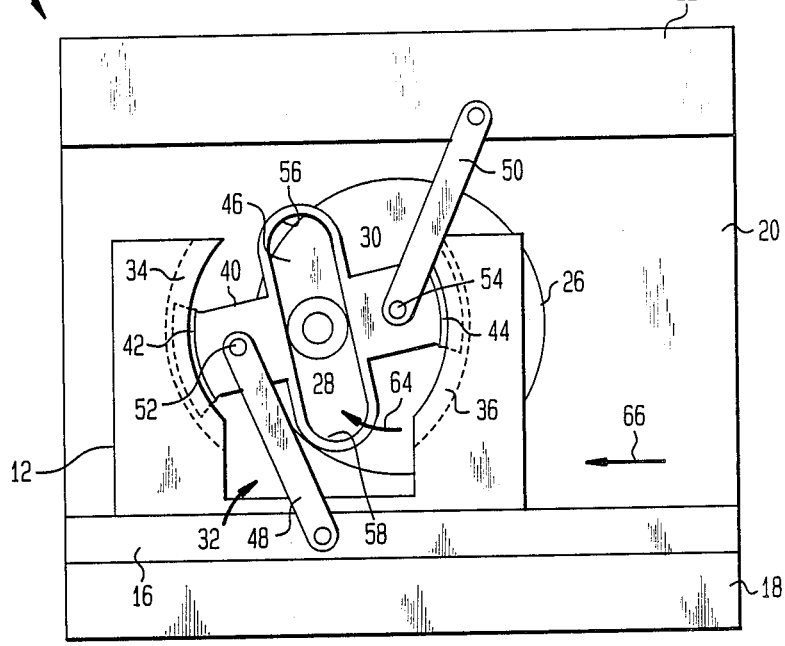
FIG. 4 is an elevational view of the motion converter illustrated in FIG. 1, the motion converter being shown at a 180° crank angle.

In the 180° crank angle position depicted in FIG. 4, the crankpin 28 has rotated in a direction indicated by arrow 64 and the bearing member 30 has moved to a position intermediate the upper end 56 and the lower end 58 of the opening 46. In this position, the slide 12 has moved in a direction indicated by arrow 66 and has reached an opposite end of its stroke, the swing 40 having been pivoted in a counter-clockwise direction such that the opening 46 and the arms 48, 50 are again skewed relative to each other. The angle of the opening 46 is selected so as not to unduly restrict the movement of the crankpin 28 from the 180° crank angle position to the 270° crank angle position.

Figure 5:
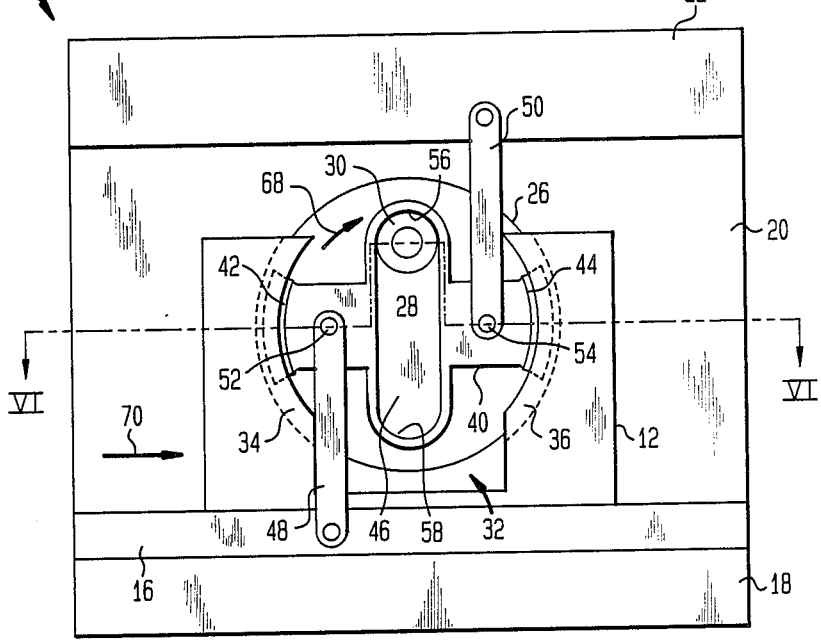
FIG. 5 is an elevational view of the motion converter illustrated in FIG. 1, the motion converter being shown at a 270° crank angle.

In the 270° crank angle position depicted in FIG. 5, the crankpin 28 has rotated in a direction indicated by arrow 68 and the bearing member 30 has moved to the upper end 56 of the opening 46. In this position, the slide 12 has moved in a direction indicated by arrow 70 to its mid-stroke position. Such movement of the slide 12 causes the arms 48, 50 to change the angular position of the swing 40, thereby pivoting the swing 40 in a clockwise direction to the position illustrated in FIG. 5.

Figure 2:
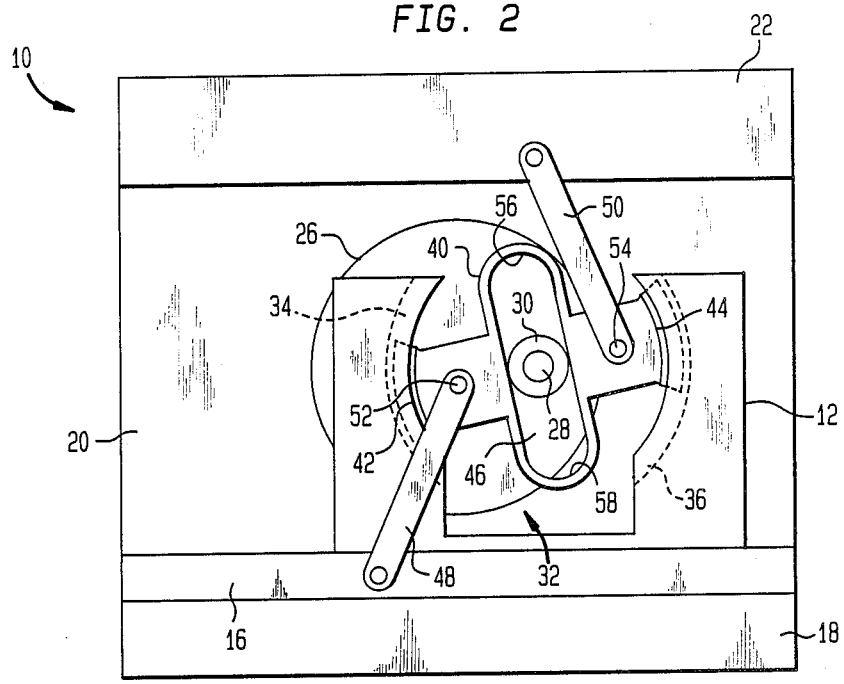
FIG. 2 is an elevational view of the motion converter illustrated in FIG. 1, the motion converter being shown at a 0° crank angle.

The continued rotation of the crankpin 28 causes a return to the 0° crank angle position depicted in FIG. 2, thereby completing the operating cycle of the motion converter 10. During such an operating cycle, side thrust is reduced by distributing forces via the arms 48, 50 into the frame members 18, 22, the crankshaft 28 thereby receiving more useable force from the crankarm 30 due to the redistribution of the side thrust friction normally experienced in the trackway 16 or other guiding means during the reciprocating movement of the slide 12. A mechanical advantage is also obtained by varying the orientation of the opening 46 relative to the slide 12. It should also be noted that the length of the arms 48, 50 determines the angular limits of the swing 40.

Six other exemplary embodiments of the present invention are illustrated in FIGS. 7–13. Elements illustrated in FIGS. 7–13 which correspond to the elements described above with respect to FIGS. 1–6 have been designated by corresponding reference numerals increased by one hundred, two hundred, three hundred, four hundred, five hundred and six hundred, respectively. The embodiments of FIGS. 7–13 operate in the same manner and offer the same alternatives as the embodiment of FIGS. 1–6 unless otherwise stated.

Figure 7:
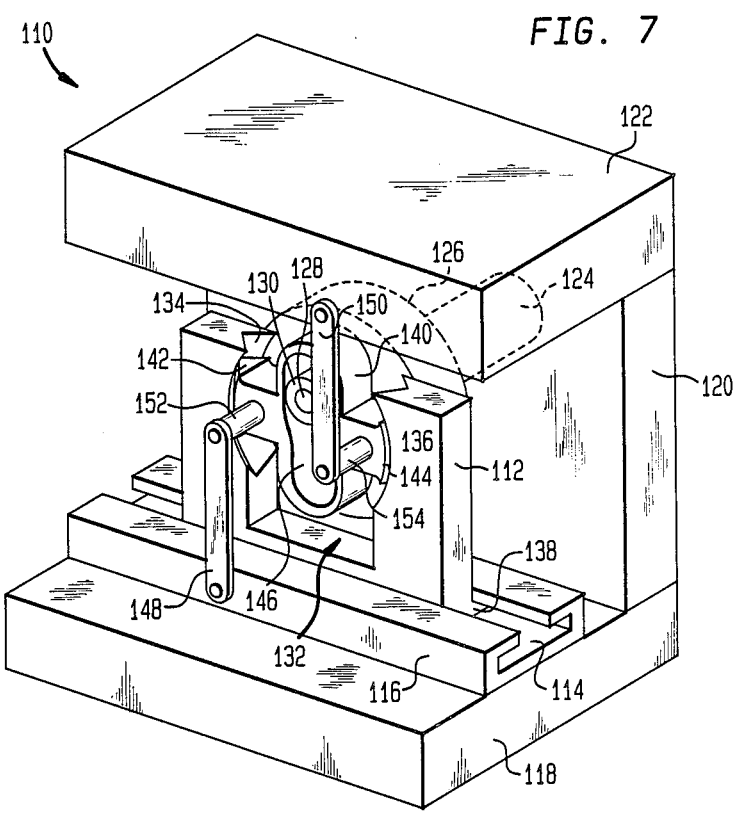
FIG. 7 is a perspective view of a second exemplary embodiment of a motion converter constructed in accordance with the present invention, the motion converter being shown at about a 260° crank angle.

Referring to FIGS. 7 and 8, there is shown a motion converter 110 which includes a slide 112 mounted for back and forth linear (i.e., rectilinear) movement along a groove 114 in a trackway 116. The trackway 116 is formed integrally with a lower frame member 118. A bearing plate 120 is mounted between the lower frame member 118 and an upper frame member 122.

A crankshaft 124 is rotatably mounted in the bearing plate 120. A crankarm 126, in the form of a disc which lies in a plane arranged normal to the crankshaft 124, is attached to the crankshaft 124 for conjoint rotation therewith. A crankpin 128, which carries a rotatable bearing member 130, is attached to the crankarm 126 such that the crankpin 128 is parallel to but offset from the crankshaft 124. Thus, as the crankshaft 124 rotates, the crankpin 128 and hence the bearing member 130 travel in a circular (i.e., orbital) path.

The slide 112 includes an open area 132 which is flanked by arcuate grooves 134, 136. The slide 112 also includes a rail 138 which is slidably received in the groove 114 of the trackway 116. A swing 140 is positioned for oscillatory movement in the open area 132. The swing 140 includes arcuate bearing shoes 142, 144 which are slidably received in the grooves 134, 136, respectively. The swing 40 also includes an elongated opening 146 having a complex/curved shape (i.e., a shape similar to that of a flattened "S" curve). The opening 146 receives the crankpin 128 such that the bearing member 130 can roll along the opening 146.

Arms 148, 150 are pivotally attached to pins 152, 154, respectively, which extend from the swing 140 on opposite sides of the opening 146. The arm 148 is also pivotally attached to the trackway 116 and hence to the lower frame member 118, while the arm 150 is also pivotally attached to the upper frame member 122.

With reference to FIG. 9, there is shown a motion converter 210 which includes a slide 212 mounted for back and forth linear (i.e., rectilinear) movement along a groove 214 in a trackway 216. The trackway 216 is formed integrally with a lower frame member 218. A bearing plate 220 is mounted between the lower frame member 218 and an upper frame member 222.

A crankshaft 224 is rotatably mounted in the bearing plate 220. A crankarm 226, in the form of a disc which lies in a plane arranged normal to the crankshaft 224, is attached to the crankshaft 224 for conjoint rotation therewith. A crankpin 228, which carries a rotatable bearing member 230, is attached to the crankarm 226 such that the crankpin 228 is parallel to but offset from the crankshaft 224. Thus, as the crankshaft 224 rotates, the crankpin 228 and hence the bearing member 230 travel in a circular (i.e., orbital) path.

The slide 212 includes an open area 232 which is flanked by arcuate grooves 234, 236. The slide 212 also includes a rail 238 (not shown) which is slidably received in the groove 214 of the trackway 216. A swing 240 is positioned for oscillatory movement in the open area 232. The swing 240 includes arcuate bearing shoes 242, 244 which are slidably received in the groves 234, 236, respectively. In this embodiment, unlike the embodiments described above, the bearing shoe 244 has a radius of curvature which is greater than the radius of curvature of the bearing shoe 242. The swing 240 also includes an elongated opening 246 which receives the crankpin 228 such that the bearing member 230 can roll along the opening 246.

Arms 248, 250 are pivotally attached to pins 252, 254, respectively, which extend from the swing 240 on opposite sides of the opening 246. The arm 248 is also pivotally attached to the trackway 216 and hence to the lower frame member 218, while the arm 250 is also pivotally attached to the upper frame member 222.

Figure 10:
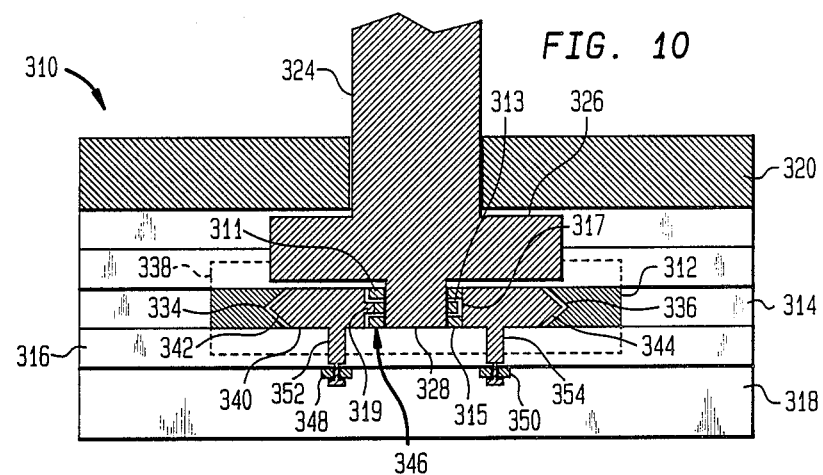
FIG. 10 is a cross-sectional view similar to FIG. 6, showing a fourth exemplary embodiment of a motion converter constructed in accordance with the present invention.

Referring to FIG. 10, bearing members 311, 313, 315 are rotatably mounted alongside each other on a crankpin 328. The bearing members 311, 315 are in rolling engagement with a bearing surface 317, while the bearing member 313 is in rolling engagement with a bearing surface 319. The bearing surfaces 317, 319 define an elongated opening 346 in a swing 340. More particularly, the bearing surface 317 is located on one side of the crankpin 328 and is in constant engagement with the bearing members 311, 315 as the bearing members 311, 315 roll back and forth along the bearing surface 317. The bearing surface 319 is located on an opposite side of the crankpin 328 and is in constant engagement with the bearing member 313 as the bearing member 313 rolls back and forth along the bearing surface 319. Although the bearing members 311, 315 have a diameter which is larger than the diameter of the bearing member 313, all of the bearing members 311, 313, 315 could have the same diameter provided that appropriate changes are made in the bearing surfaces 317, 319.

Figure 11:
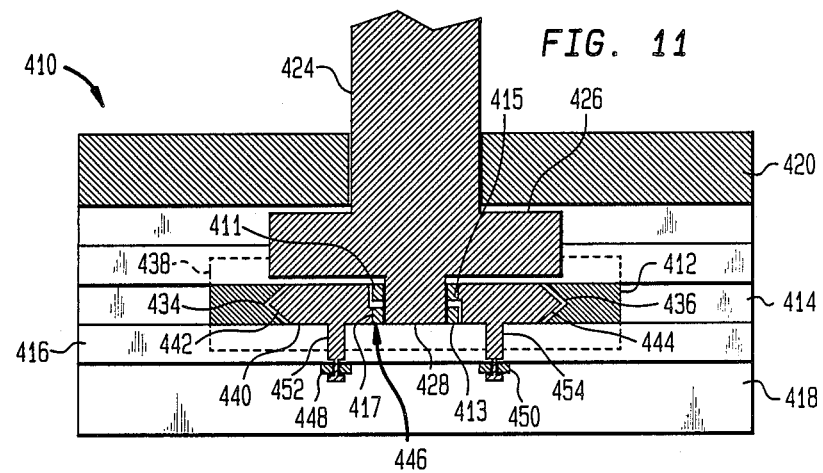
FIG. 11 is a cross-sectional view similar to FIG. 6 showing a fifth exemplary embodiment of a motion converter constructed in accordance with the present invention.

Referring to FIG. 11, bearing members 411, 413 are rotatably mounted alongside each other on a crankpin 428. The bearing member 411 is in rolling engagement with a bearing surface 415, while the bearing member 413 is in rolling engagement with a bearing surface 417. The bearing surfaces 415, 417, which are offset relative to each other, define an elongated opening 446 in a swing 440. More particularly, the bearing surface 415 is located on one side of the crankpin 428 and is in constant engagement with the bearing member 411 as the bearing member 411 rolls back and forth along the bearing surface 415. The bearing surface 417 is located on an opposite side of the crankpin 428 and is in constant engagement with the bearing member 413 as the bearing member 413 rolls back and forth along the bearing surface 417. Although the bearing members 411, 413 have the same diameter, their diameters could be different from each other provided that appropriate changes are made in bearing surfaces 415, 417.

Referring to FIG. 12, there is shown a motion converter 510 which includes a slide 512 mounted for back and forth linear (i.e., rectilinear) movement along a groove 514 in a trackway 516. The trackway 516 is formed integrally with a lower frame member 518. A bearing plate 520 is mounted between the lower frame member 518 and an upper frame member 522.

A crankshaft 524 is rotatably mounted in the bearing plate 520. A crankarm 526, in the form of a disc which lies in a plane arranged normal to the crankshaft 524, is attached to the crankshaft 524 for conjoint rotation therewith. A crankpin 528, which carries a rotatable bearing member 530, is attached to the crankarm 526 such that the crankpin 528 is parallel to but offset from the crankshaft 524. Thus, as the crankshaft 524 rotates, the crankpin 528 and hence the bearing member 530 travel in a circular (i.e., orbital) path.

The slide 512 includes an open area 532 which is flanked by arcuate grooves 534, 536. The slide 512 also includes a rail 538 (not shown) which is slidably received in the groove 514 of the trackway 516. A swing 540 is positioned for oscillatory movement in the open area 532. The swing 540 includes arcuate bearing shoes 542, 544 which are slidably received in the grooves 534, 536, respectively. The swing 540 also includes an elongated opening 546, which is arranged at an angle of, for example, about 10° relative to the vertical when the swing 40 is in the position illustrated in FIG. 11 (i.e., at about an 80° crank angle position). The opening 546 receives the crankpin 528 such that the bearing member 530 can roll along the opening 546.

Arms 548, 550 are pivotally attached to pins 552, 554, respectively, which extend from the swing 540 on opposite sides of the opening 546. The arm 548 is also pivotally attached to the trackway 516 and hence to the lower frame member 518, while the arm 550 is also pivotally attached to the upper frame member 522.

Referring to FIG. 13, there is shown a motion converter 610 which includes a slide 612 mounted for back and forth linear (i.e., rectilinear) movement along a groove 614 in a trackway 616. The trackway 616 is formed integrally with a lower frame member 618. A bearing plate 620 is mounted between the lower frame member 618 and an upper frame member 622.

A crankshaft 624 is rotatably mounted in the bearing plate 620. A crankarm 626, in the form of a disc which lies in a plane arranged normal to the crankshaft 624, is attached to the crankshaft 624 for conjoint rotation therewith. A crankpin 628, which carries a rotatable bearing member 630, is attached to the crankarm 626 such that the crankpin 628 is parallel to but offset from the crankshaft 624. Thus, as the crankshaft 624 rotates, the crankpin 628 and hence the bearing member 630 travel in a circular (i.e., orbital) path.

The slide 612 includes an open area 632 which is flanked by arcuate grooves 634, 636. The slide 612 also includes a rail 638 (not shown) which is slidably received in the groove 614 of the trackway 616. A swing 640 is positioned for oscillatory movement in the open area 632. The swing 640 includes arcuate bearing shoes 642, 644 which are slidably received in the grooves 634, 636, respectively. The swing 640 includes an elongated opening 646 having a curved shape. The opening 646 receives the crankpin 628 such that the bearing member 630 can roll along the opening 646.

Arms 648, 650 are pivotally attached to pins 652, 654, respectively, which extend from the swing 640 on opposite sides of the opening 646. The arm 648 is also pivotally attached to the trackway 616 and hence to the lower frame member 618, while the arm 650 is also pivotally attached to the upper frame member 622.

It will be understood that the embodiments described herein are merely exemplary and that a person skilled in the art may make many variations and modifications without departing from the spirit and scope of the invention. For instance, the present invention is applicable to many different types of machines, such as compactors, pumps, motors, punch presses, robots, sewing machines, generators, locks, piston engines and compressors, in which rectilinear motion is converted to rotary motion or vice versa. In a piston engine application, the pistons and cylinders can replace the grooved trackways 16, 116, 216, 316, 416, 516, 616 as the guiding means for the slides 12, 112, 212, 312, 412, 512, 612, respectively. Of course, any other suitable type of guiding means may be employed. All such modifications and variations are intended to be included within the scope of the invention as defined in the appended claims.

I claim:

1. A device for interconverting rectilinear and rotary motion, comprising a frame; a slide mounted for reciprocating linear movement relative to said frame, said slide including a first bearing surface, a second bearing surface, and a swing mounted for oscillatory movement relative to said slide as well as for reciprocating linear movement conjointly with said slide; said swing including an elongated opening, a third bearing surface which is movable along said first bearing surface, and a fourth bearing surface which is movable along said second bearing surface, said third and fourth bearing surfaces being located on a periphery of said swing; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means pivotally connected between said frame and said swing for oscillating said swing relative to said slide as said slide reciprocates relative to said frame, such oscillation of said swing causing said third and fourth bearing surfaces to move along said first and second bearing surfaces, respectively, whereby side thrust exerted on said frame by said slide is reduced.

2. The device of claim 1, wherein said third bearing surface is located on a first peripheral portion of said swing, said first peripheral portion being located on one side of said elongated opening, and said fourth bearing surface is located on a second peripheral portion of said swing, said second peripheral portion being located on an opposite side of said elongated opening.

3. The device of claim 1, wherein said oscillating means includes at least one arm pivotally attached to said frame and to said swing.

4. The device of claim 3, wherein said oscillating means includes a first arm pivotally attached to said swing on one side of said elongated opening and pivotally attached to one side of said frame and a second arm pivotally attached to said swing on an opposite side of said elongated opening and pivotally attached to an opposite side of said frame.

5. The device of claim 1, wherein said first bearing surface has a first radius of curvature, said second bearing surface has a second radius of curvature, said third bearing surface has a third radius of curvature, which is the same as said first radius of curvature, and said fourth bearing surface has a fourth radius of curvature, which is the same as said second radius of curvature.

6. The device of claim 5, wherein said first and third radii of curvature are the same as said second and fourth radii of curvature.

7. The device of claim 5, wherein said first and third radii of curvature are less than said second and fourth radii of curvature.

8. The device of claim 1, wherein the oscillatory movement of said swing causes the orientation of said elongated opening relative to said slide to be varied as said slide reciprocates relative to said frame.

9. The device of claim 8, wherein the orientation of said elongated opening relative to said slide is constantly varied as said slide reciprocates relative to said frame.

10. The device of claim 1, wherein said crankpin includes at least one bearing member rotatably mounted thereon.

11. The device of claim 10, wherein said crankpin includes at least two bearing rotatably mounted thereon.

12. The device of claim 11, wherein said crankpin includes first and second bearing members rotatably mounted thereon and said elongated opening includes first and second bearing surfaces, said first bearing surface being located on one side of said crankpin in constant engagement with said first bearing member as said first bearing member moves back and forth along said first bearing surface and said second bearing surface being located on an opposite side of said crankpin in constant engagement with said second bearing member as said second bearing member moves back and forth along said second bearing surface.

13. The device of claim 11, wherein said crankpin includes first, second and third bearing members rotatably mounted thereon and said elongated opening includes first and second bearing surfaces, said first bearing surface being located on one side of said crankpin in constant engagement with said first and third bearing members as said first and third bearing members move back and forth along said first bearing surface and said second bearing surface being located on an opposite side of said crankpin in constant engagement with said second bearing member as said second bearing member moves back and forth along said second bearing surface.

14. The device of claim 1, wherein said elongated opening is straight.

15. The device of claim 14, wherein said elongated opening is angled.

16. The device of claim 1, wherein said elongated opening has a complex/curved shape.

17. The device of claim 1, wherein said elongated opening has a curved shape.

18. A device for interconverting rectilinear and rotary motion, comprising a frame; a slide mounted for reciprocating linear movement relative to said frame, said slide including a swing mounted for oscillatory movement relative to said slide as well as for reciprocating linear movement conjointly with said slide, said swing including an elongated opening and said swing being guided at a plurality of peripheral surfaces by contiguous surfaces on said slide as said swing oscillates relative to said slide during the conjoint linear movement of said swing and said slide; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means for oscillating said swing relative to said slide as said slide reciprocates relative to said frame, said oscillating means including a first arm pivotally attached to said swing on one side of said elongated opening and pivotally attached to one side of said frame and a second arm pivotally attached to said swing on an opposite side of said elongated opening and pivotally attached to an opposite side of said frame, neither said first arm nor said second arm being directly attached to said slide, whereby side thrust exerted on said frame by said slide is reduced.

19. The device of claim 18, wherein said contiguous surfaces on said slide have first and second bearing surfaces and said plurality of periperal surfaces on said swing have third and fourth bearing surfaces, said third bearing surface being movable along said first bearing surface and said fourth bearing surface being movable along said second bearing surface.

20. The device of claim 19, wherein said third bearing surface is located on a first peripheral portion of said swing, said first peripheral portion being located on one side of said elongated opening, and said fourth bearing surface is located on a second peripheral portion of said swing, said second peripheral portion being located on an opposite side of said elongated opening.

21. The device of claim 19, wherein said first bearing surface has a first radius of curvature, said second bearing surface has a second radius of curvature, said third bearing surface has a third radius of curvature, which is the same as said first radius of curvature, and said fourth bearing surface has a fourth radius of curvature, which is the same as said second radius of curvature.

22. The device of claim 21, wherein said first and third radii of curvature are the same as said second and fourth radii of curvature.

23. The device of claim 21, wherein said first and third radii of curvature are less than said second and fourth radii of curvature.

24. The device of claim 18, wherein the oscillatory movement of said swing causes the orientation of said elongated opening realtive to said slide to be varied as said slide reciprocates relative to said frame.

25. The device of claim 24 wherein the orientation of said elongated opening relative to said slide is constantly varied as said slide reciprocates relative to said frame.

26. The device of claim 18, wherein said crankpin includes at least one bearing member rotatably mounted thereon.

27. The device of claim 26, wherein said crankpin includes at least two bearing members rotatably mounted thereon.

28. The device of claim 27, wherein said crankpin includes first and second bearing members rotatably mounted thereon and said elongated opening includes first and second bearing surfaces, said first bearing surface being located on one side of said crankpin in constant engagement with said first bearing member as said first bearing member moves back and forth along said first bearing surface and said second bearing surface being located on an opposite side of said crankpin in constant engagement with said second bearing member as said second bearing member moves back and forth along said second bearing surface.

29. The device of claim 27, wherein said crankpin includes first, second and third bearing members rotatably mounted thereon and said elongated opening includes first and second bearing surfaces, said first bearing surface being located on one side of said crankpin in constant engagement with said first and third bearing members as said first and third bearing members move back and forth along said first bearing surface and said second bearing surface being located on an opposite side of said crankpin in constant engagement with said second bearing member as said second bearing member moves back and forth along said second bearing surface.

30. The device of claim 18, wherein said elongated opening is straight.

31. The device of claim 30, wherein said elongated opening is angled.

32. The device of claim 18, wherein said elongated opening has a complex/curved shape.

33. The device of claim 18, wherein said elongated opening has a curved shaped.

34. A device for interconverting rectilinear and rotary motion, comprising a frame; a slide mounted for reciprocating linear movement relative to said frame, said slide including a first bearing surface, a second bearing surface, and a swing mounted for oscillatory movement relative to said slide as well as for reciprocating linear movement conjointly with said slide, said swing including an elongated opening, a third bearing surface which is movable along said first bearing surface, and a fourth bearing surface which is movable along said second bearing surface, said third and fourth bearing surfaces being located on a periphery of said swing; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means pivotally connected between said frame and said swing for oscillating said swing relative to said slide as said slide reciprocates relative to said frame, such oscillation of said swing causing said third and fourth bearing surfaces to move along said first and second bearing surfaces, respectively, wherey the orientation of said elongated opening relative to said slide changes as said slide reciprocates relative to said frame.

35. The device of claim 34, wherein said third bearing surface is located on a first peripheral portion of said swing, said first peripheral portion being located on one side of said elongated opening, and said fourth bearing surface is located on a second peripheral portion of said swing, said second peripheral portion being located on an opposite side of said elongated opening.

36. The device of claim 34, wherein said oscillating means includes at least one arm pivotally attached to said frame and to said swing.

37. The device of claim 36, wherein said oscillating means includes a first arm pivotally attached to said swing on one side of said elongated opening and pivotally attached to one side of said frame and a second arm pivotally attached to said swing on an opposite side of said elongated opening and pivotally attached to an opposite side of said frame.

38. The device of claim 34, wherein said first bearing surface has a first radius of curvature, said second bearing surface has a second radius of curvature, said third bearing surface has a third radius of curvature, which is the same as said first radius of curvature, and said fourth bearing surface has a fourth radius of curvature, which is the same as said second radius of curvature.

39. The device of claim 38, wherein said first and third radii of curvature are the same as said second and fourth radii of curvature.

40. The device of claim 38, wherein said first and third radii of curvature are less than said second and fourth radii of curvature.

41. The device of claim 34, wherein the orientation of said elongated opening relative to said slide is constantly varied as said slide reciprocates relative to said frame.

42. The device of claim 34, wherein said crankpin includes at least one bearing member rotatably mounted thereon.

43. The device of claim 42, wherein said crankpin includes at least two bearing members rotatably mounted thereon.

44. The device of claim 43, wherein said crankpin includes first and second bearing members rotatably mounted thereon and said elongated opening includes first and second bearing surfaces, said first bearing surface being located on one side of said crankpin in constant engagement with said first bearing member as said first bearing member moves back and forth along said first bearing surface and said second bearing surface being located on an opposite side of said crankpin in constant engagement with said second bearing member as said second bearing member moves back and forth along said second bearing surface.

45. The device of claim 42, wherein said crankpin includes first, second and third bearing members rotatably mounted thereon and said elongated opening includes first and second bearing surfaces, said first bearing surface being located on one side of said crankpin in constant engagement with said first and third bearing members as said first and third bearing members move back and forth along said first bearing surface and said second bearing surface being located on an opposite side of said crankpin in constant engagement with said second bearing member as said second bearing member moves back and forth along said second bearing surface.

46. The device of claim 34, wherein said elongated opening is straight.

47. The device of claim 46, wherein said elongated opening is angled.

48. The device of claim 34, wherein said elongated opening has a complex/curved shape.

49. The device of claim 34, wherein said elongated opening has a curved shape.

50. A device for interconverting rectilinear and rotary motion, comprising a frame; a slide mounted for reciprocating linear movement relative to said frame, said slide including a swing mounted for oscillator movement relative to aid slide as wel as for reciprocating linear movement conjointly with said slide, said swing including an elongated opening and said swing being guided at a plurality of peripheral surfaces by contiguous surfaces on said slide as said swing oscillates relative to said slide during the conjoint linear movement of said swing and said slide; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means for oscillating said swing relative to said slide as said slide reciprocates relative to said frame, said oscillating means including a first arm pivotally attached to said swing on one side of said elongated opening and pivotally attached to one side of said frame and a second arm pivotally attached to said swing on an opposite side of said elongated opening and pivotally attached to an opposite side of said frame, neither said first arm nor said second arm being directly attached to said slide, whereby the orientation of said elongated opening relative to said slide changes as said slide reciprocates relative to said frame.

51. The device of claim 50, wherein said continguous surfaoes on said slide have first and second bearing surfaces and said plurality of peripheral surfaces on said swing have third and fourth bearing surfaces, said third bearing surface being movable along said first bearing surface and said fourth bearing surface being movable along said second bearing surface.

52. The device of claim 51, wherein said third bearing surface is located on a first peripheral portion of said swing, said first peripheral portion being located on one side of said elongated opening, and said fourth bearing surface is located on a second peripheral portion of said swing, said second peripheral portion being located on an opposite side of said elongated opening.

53. The device of claim 51, wherein said first bearing surface has a first radius of curvature, said second bearing surface has a second radius of curvature, said third bearing surface has a third radius of curvature, which is the same as said first radius of curvature, and said fourth bearing surface has a fourth radius of curvature, which is the same as aid second radius of curvature.

54. The device of olaim 53, wherein said first and third radii of curvature are the same as said second and fourth radii of curvature.

55. The device of claim 53, wherein said first and third radii of curvature are less than said second and fourth radii of curvature.

56. The device of claim 50, wherein the orientation of said elongated opening relative to said slide is constantly varied as said slide reciprocates relative to said frame.

57. The device of claim 50, wherein said crankpin includes at least one bearing member rotatably mounted thereon.

58. The device of claim 57, wherein said crankpin includes at least two bearing members rotatably mounted thereon.

59. The device of claim 58, wherein said crankpin includes first and second bearing members rotatably mounted thereon and said elongated opening includes first and second bearing surfaces, said first bearing surface being located on one side of said crankpin in constant engagement with said first bearing member as said first bearing member moves back and forth along said first bearing surface and said second bearing surface being located on an opposite side of said crankpin in constant engagement with said second bearing member as said second bearing member moves back and forth along said second bearing surface.

60. The device of claim 58, wherein said crankpin includes first, second and third bearing members rotatably mounted thereon and said elongated opening includes first and second bearing surfaces, said first bearing surface being located on one side of said crankpin in constant engagement with said first and third bearing members as said first and third bearing members move back and forth along said first bearing surface and said second bearing surface being located on an opposite side of said crankpin in constant engagement with said second bearing member as said second bearing member moves back and forth along said second bearing surface.

61. The device of claim 50, wherein said elongated opening is straight.

62. The device of claim 61, wherein said elongated opening is angled.

63. The device of claim 50, wherein said elongated opening has a complex/curved shape.

64. The device of claim 50 wherein said elongated opening has a curved shaped.

65. In a device for interconverting rectilinear and rotary motion, which device includes a frame, a slide mounted for reciprocating linear movement relative to said frame and a rotatable crank, having a crankpin received in an elongated opening such that said crankpin moves back and forth along said elongated opening as said crank rotates, whereby the rotary motion of said crank is converted into the rectilinear motion of said slide or vice versa, the improvement comprising reducing means for reducing side thrust exerted on said frame by said slide as said slide reciprocates relative to said frame, said reducing means including a swing mounted for oscillatory movement relative to said slide as well as for reciprocating linear movement conjointly with said slide, said swing including said elongated opening, a first bearing surface which is movable along a second bearing surface located on said slide, and a third bearing surface which is movable along a fourth bearing surface located on said slide, said first and third bearing surfaces being located on a periphery of said swing, and oscillating means pivotally connected between said frame and said swing for oscillating said swing relative to said slide as said slide reciprocates relative to said frame, such oscillation of said swing causing said first and third bearing surfaces to move along said second and fourth bearing surfaces, respectively.

66. The device of claim 65, wherein said first bearing surface is located on a first peripheral portion of said swing, said first peripheral portion being located on one side of said elongated opening, and said third bearing surface is located on a second peripheral portion of said swing, said second peripheral portion being located on an opposite side of said elongated opening.

67. The improvement of claim 65, wherein said oscillating means includes at least one arm pivotally attached to said frame and to said swing.

68. The improvement of claim 67, wherein said oscillating means includes a first arm pivotally attached to said swing on one side of said elongated opening and pivotally attached to one side of said frame and a second arm pivotally attached to said swing on an opposite side of said elongated opening and pivotally attached to an opposite side of said frame.

69. The improvement of claim 65, wherein the oscillating movement of said swing causes the orientation of said elongated opening relative to said slide to change as said slide reciprocates relative to said frame.

70. The improvement of claim 69, wherein the orientation of said elongated opening relative to said slide is constantly varied as said reciprocates relative to said frame.

71. In a device for interconverting rectilinear and rotary motion, which device includes a frame, a slide mounted for reciprocating linear movement relative to said frame, and a rotatable crank, having a crankpin received in an elongated opening such that said crankpin moves back and forth along said elongated opening as said crank rotates, whereby the rotary motion of said crank is converted into the rectilinear motion of said slide or vice versa, the improvement comprising reducing means for reducing side thrust exerted on said frame by said slide as ssaid slide reciprocates relative to said frame, said reducing means including a swing mounted for oscillatory movement relative to said slide as well as for reciprocating linear movement conjointly with said slide, said swing including said elongated opening and said swing being guided at a plurality of peripheral surfaces by contiguous surfaces on said slide as said swing oscillates relative to said slide during the conjoint linear movement of said swing and said slide, and oscillating means for oscillating said swing relative to said slide as said slide reciprocates relative to said frame, said oscillating means including a first arm pivotally attached to said swing on one side of said elongated opening and pivotally attached to one side of said frame and a second arm pivotally attached to said swing on an opposite side of said elongated opening and pivotally attached to an opposite side of said frame, neither said first arm nor said second arm being directly attached to said slide.

72. The improvement of claim 71, wherein the oscillating movement of said swing causes the orientation of said elongated opening relative to said slide to change as said slide reciprocates relative to said frame.

73. The improvement of claim 72, wherein the orientation of said elongated opening relative to said slide is constantly varied as said side reciprocates relative to said frame.

74. In a device for interconverting rectilinear and rotary motion, which device includes a frame, a slide mounted for reciprocating linear movement relative to said flame, and a rotatable crank, having a crankpin received in an elongated opening such that said crank pin moves back and forth along said elongated opening as said crank rotates, whereby the rotary motion of said crank is converted into the rectilinear motion of said slide slide or vice versa, the improvement comprising varying means for constantly varying the orientation of said elongated opening relative to said slide as said slide reciprocates relative to said frame, said varying means including a swing mounted for oscillatory movement relative to said slide as well as for reciprocating linear movement conjointly with said slide, said swing including said elongated opening, a first bearing surface which is movable along a second bearing surface located on said slide, and a third bearing surface which is movable along a fourth bearing surface located on said slide, said first and third bearing surfaces being located on a peripheray of said swing, and oscillating means pivotally connected between said frame and said swing for oscillating said swing relative to said slide as said slide reciprocates relative to said frame, such oscillation of said swing causing said first and third bearing surfaces to move along said second and fourth bearing surfaces, respectively.

75. The improvement of claim 74, wherein said first bearing surface is located on a first peripheral portion of said swing, said first peripheral portion being located on one side of said elongated opening, and said third bearing surface is located on a second peripheral portion of said swing, said second peripheral portion being located on an opposite side of said elongated opening.

15

76. The improvement of claim 74, wherein said oscillating means includes at least one arm pivotally attached to said frame and to said swing.

77. The improvement of claim 76, wherein said means includes a first arm pivotally attached to said swing on one side of said elongated opening and pivotally attached to one side of said frame and a second arm pivotally attached to said swing on an opposite side of said elongated opening and pivotally attached to an opposite side of said frame.

78. In a device for interconverting rectilinear and rotary motion, which device includes a frame, a slide mounted for reciprocating linar movement rlative to said frame and including an elongated opening, and a rotatable crank, having a crankpin received in an elongated opening such that such said crankpin moves back and forth along said elongated opening as said crank rotates, whereby the rotary motion of said crank is converted into the rectilinear motion of said slide or vice versa, the improvement comprsiing varying means for constantly varying the orientation of said elongated opening relative to said slide as said slide reciprocates relative to said frame, said varying means including a swing mounted for oscilllatory movement relative to said slide as well as for rciprocating linear movement conjointly with said slide, said swing including said elongated opening and saids swing being guided at a plurality of peripheral surfaces by contiguous surfaces on said slide as said swing oscillates relative to said slide during the conjoint linear movement of said swing and said slide, and oscillating means for oscillating said swing relative to said slide as said slide reciprocates relative to said frame, said oscillating means including a first arm pivotally attached to said swing on one side of said elongated opening and pivotally attached to one side of said frame and a second arm pivotally attached to said swing on an opposite side of said elongated opening and pivotally attached to an opposite side of said rame, neither said first arm nor said second arm being directly attached to said slide.

79. A method of reducing side thrust exerted on a frame by a slide mounted for rectilinear movmenet relative to said frame and interacting with a rotatable crank, which includes a crankpin movable back and forth along an elongated opening as said crank rotates, such that the rotary motion of said crank is converted into the rectilinear motion of said slide or vice versa, said method comprising the steps of providing said elongated opening in a swing mounting for oscillatory movement relative to said slide as well as for reciprocating linear movement conjointly with said slide, said swing including a first bearing surface which is movable along a second bearing surface located on said slide and a third bearing surface which is movable along a fourth bearing surface located on said slide, said first and third bearing surfaces being located on a periphery of said swing, and pivotally connecting said swing to said frame such that the reciprocating movement of said slide relative to said frame causes the oscillatory movement of said swing relative to said slide, such oscillation of said swing causing said first and third bearing surfaces to move along said second and fourth bearing surfaces, respectively.

80. The method of claim 79, wherein said first bearing surface is located on a first peripheral portion of said swing, said first peripheral portion being located on one side of said elongated opening, and said third bearing surface is located on a second peripheral portion of said swing, said second peripheral portion being located on an opposite side of said elongated opening.

81. The method of claim 79, wherein said swing is connected to said frame by at least one arm which is pivotally attached to said frame and to said swing.

82. The method of claim 81, wherein said swing is connected to said frame by a first arm pivotally attached to said swing on one side of said elongated opening and pivotally attached to one side of said frame and a second arm pivotally attached to said swing on an opposite side of said elongated opening and pivotally attached to an opposite side of said frame.

83. The method of claim 79, wherein the orientation of said elongated opening relative to said slide is constantly varied as siad slide reciprocates relative to said frame.

84. A method of reducing side thrust exerted on a frame by a slide mounted for rectilinear movement relative to said frame and interacting with a rotative crank which includes a crankpin movable back and forth along an elongated opening as said crank rotates, such that the rotary motion of said crank is converted into the rectilinear motion of slaid slide or vice versa, said method comprising the steps of providing said elongated opening in a swing mounted for oscillatory movement relative to said slide as well as for reciprocating linear movement conjointly with said slide, guiding said swing at a plurality of peripheral surfaces by contiguous surfaces on said slide as said swing oscillates relative to said slide during the conjoint linear movement of said swing and said slide, and pivotally connecting said swing to said frame such that the reciprocating movement of said slide relative to said frame causes the oscillatory movement of said swing relative to said slide, said swing being pivotally connected to said frame by a first arm which is pivotally attached to said swing on one side of said elongated opening and is pivotally attached to one side of said frame and by a second arm which is pivotally attached to said swing on an opposite side of said elongated opening and is pivotally attached to an opposite side of said frame, neither said first arm nor said second arm being directly attached to said slide.

85. The method of claim 84, wherein the orientation of said elongated opening relative to said slide is constantly varied as said slide reciprocates relative to said frame.

86. A method of constantly varying the orientation of an elongated opening which is mounted for rectilinear movement relative to a frame, said elongated opening receiving a crankpin of a rotatable carnk such that said crankpin moves back and forth along said elongated opening as said crank rotates, whereby the rotary motion of said crank is converted into the rectilinear motion of a slide or vice versa, said method comprising the steps of providing said elongated opening in a swing mounted for oscillatory movement relative to said slide as well as for reciprocating linear movement conjointly with said slide, saids swing including a first bearing surface which is movable along a second bearing surface located on said slide and a third bearing surface which is movable along a fourth bearing surface located on said slide said first and third bearing surfaces being located on a periphery of said swing, and pivotally connecting said swing to said frame such that the reciprocating movement of said slide relative to said frame causes the oscillator movement of said swing relative to said slide, such oscillation of said swing causing said first and third bearing surfaces to move along said second and fourth bearing surfaces, respectively.

87. The method of claim 86, wherein said first bearing surface is located on a first peripheral portion of said swing, said first peripheral portion being located on one side of said elongated opening, and said third bearing surface is located on a second peripheral portion of said swing, said second peripheral portion being located on an opposite side of said elongated opening.

88. The method of claim 86, wherein said swing is connected to said frame by at least one arm which is pivotally attached to said frame and to said swing.

89. The method of claim 88, wherein said swing is connected to said frame by a first arm pivotally attached to said swing on one side of said elongated opening and pivotally attached to one side of said frame and a second arm pivotally attached to said swing on an opposite side of said elongated opening and pivotally attached to an opposite side of said frame.

90. A method of constantly varying the orientation of an elongated opeing which is mounted for rectilinear movement relative to a frame, said elongated opening receiving a crankpin of a rotatable crank such that said crankpin moves back and forth along said elongated opening as said carnk rotates, whereby the rotary motion of said crank is converted into the rectilinear motion of a slide or vice versa, said method comprising the steps of providing said elongated opening in a swing mounted for oscillatory movement relative to said slide as well as for reciprocating linear movement conjointly with said slide, guiding said swing at a plurality of peripheral surfaces by contiguous surfaces on said slide as said swing oscillates relative to said slide during the conjoint linear movement of said swing and said slide, and pivotally connecting said swing to said frame such that the reciprocating movement of said slide relative to said frame causes the oscillatory movement of said swing relative to said slide, said swing being pivotally connected to said frame by a first arm which is pivotally attached to said swing on one side of said elongated opening and is pivotally attached to one side of said frame and by a second arm which is pivotally attached to said swing on an opposite side of said elongated opening and is pivotally attached to an opposite side of said frame, neither said first arm nor said second arm being directly attached to said slide.

91. A device for interconverting rectilinear and rotary motion, comprising a frame; a slide mounted for reciprocating linear movement relative to said frame, said slide including a first bearing surface having a first radius of curvature, a seocnd bearing surface having a second radius of curvature which is greater than said first radius of curvature, and a swing mounted for oscillatory movement relative to said slide as well as for reciprocating linear movement conjointly with said slide, said swing including an elongated opening, a third bearing surface having a third radius of curvature which is the same as said first radius of curvature such that said third bearing surface is movable along said first bearing surface, and a fourth bearing surface having a fourth radius of curvature which is the same as said second radius of curvature such that said fourth bearing surface is movable along said second bearing surface; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means connected between said frame and said swing for oscillating said swing relative to said slide as said slide reciprocates relative to said frame, such oscillation of said swing causing said third and fourth bearing surfaces to move along said first and second bearing surfaces, respectively, whereby side thrust exerted on said frame by said slide is reduced.

92. A device for interconverting rectilinear and rotary motion, comprising a frame; a slide mounted for reciprocating linear movement relative to said frame, said slide including a first bearing surface having a first radius of curvature, a second bearing surface having a second radius of curvature which is greater than said first radius of curvature, and a swing mounted for oscillatory movement relative to said slide as well as for reciprocating linear movement conjointly with said slide, said swing including an elongated opening, a third bearing surface having a third radius of curvature which is the same as said first radius of curvature such that said said third bearing surface is movable along said first bearing surface, and a fourth bearing surface having a fourth radius of curvature which is the same as said second radius of curvature such that said fourth bearing surface is movable along said second bearing surface; a rotatable crank, having a crankpin received in said elongated opening of said swing such that said crankpin moves back and forth along said elongated opening as said crank rotates, whereby the rotary motion of said crank is converted into the rectilinear motion of said slide or vice versa; and oscillating means connected between said frame and said swing for oscillating said swing relative to said slide as said slide reciprocates relative to said frame, such oscillation of said swing causing said third and fourth bearing surfaces to move along said first and second bearing surfaces, respectively, whereby the orientation of said elongated opening relative to said slide changes as said slide reciprocates relative to said frame.

* * * * *

UNITED STATES PATENT AND TRADEMARK OFFICE
CERTIFICATE OF CORRECTION

PATENT NO. : 4,779,472
DATED : October 25, 1988
INVENTOR(S) : Douglas C. Brackett It is certified that error appears in the above-indentified patent and that said Letters Patent is hereby corrected as shown below:

Column 14, line 38, delete "flame" and insert --frame--.
Column 15, line 13, delete "rlative" and insert --relative--.
Column 15, line 4, after "said", insert --oscillating--.

line 14, after "frame", delete "and including an elongated opening".

Column 16, line 19, delete "rotative" and insert --rotatable--.

line 67, delete "oscillator " and insert --oscillatory--.

Signed and Sealed this

Nineteenth Day of July, 1994

Attest:

BRUCE LEHMAN

Attesting Officer     Commissioner of Patents and Trademarks